United States Patent
Laurberg (10) Patent No.: US 9,316,206 B2
(45) Date of Patent: Apr. 19, 2016

(54) METHOD OF AND DEVICE FOR DETERMINING A COMMON BLADE FREQUENCY OF A ROTOR OF A WIND TURBINE, AND METHOD OF OPERATING A WIND TURBINE

(75) Inventor: Hans Laurberg, Århus C (DK)

(73) Assignee: SIEMENS AKTIENGESELLSCHAFT, München (DE)

( * ) Notice: Subject to any disclaimer, the term of this patent is extended or adjusted under 35 U.S.C. 154(b) by 371 days.

(21) Appl. No.: 13/212,474

(22) Filed: Aug. 18, 2011

(65) Prior Publication Data

US 2012/0068462 A1    Mar. 22, 2012

(30) Foreign Application Priority Data

Sep. 21, 2010  (EP) .................. EP10177991

(51) Int. Cl.
| | |
|---|---|
| *G01N 27/80* | (2006.01) |
| *G01R 1/04* | (2006.01) |
| *G01R 1/20* | (2006.01) |
| *G01R 5/14* | (2006.01) |
| *F03D 7/02* | (2006.01) |
| *F03D 11/00* | (2006.01) |

(52) U.S. Cl.
CPC .......... *F03D 7/0296* (2013.01); *F03D 11/0091* (2013.01); *F05B 2260/96* (2013.01); *F05B 2270/326* (2013.01); *F05B 2270/327* (2013.01); *F05B 2270/334* (2013.01); *F05B 2270/807* (2013.01); *F05B 2270/808* (2013.01); *Y02E 10/722* (2013.01); *Y02E 10/723* (2013.01)

(58) Field of Classification Search
CPC ........................................................ F03D 3/04
USPC ........... 702/59, 62, 65, 75, 106, 179, 197, 56; 73/660; 290/44
See application file for complete search history.

(56) References Cited

U.S. PATENT DOCUMENTS

| | | | | | |
|---|---|---|---|---|---|
| 4,097,192 | A | * | 6/1978 | Kulina ......................... | 416/175 |
| 4,366,387 | A | * | 12/1982 | Carter et al. ................... | 290/55 |
| 4,420,692 | A | * | 12/1983 | Kos et al. ....................... | 290/44 |
| 6,626,642 | B1 | * | 9/2003 | Veldkamp ...................... | 416/79 |
| 7,400,055 | B2 | * | 7/2008 | Nagao ............................ | 290/44 |
| 8,039,981 | B2 | * | 10/2011 | Egedal et al. ................... | 290/44 |
| 8,226,347 | B2 | * | 7/2012 | Bywaters ......................... | 415/1 |
| 8,286,494 | B2 | * | 10/2012 | Birkemose et al. ............. | 73/660 |
| 8,362,632 | B2 | * | 1/2013 | Nielsen et al. .................. | 290/44 |
| 2010/0078940 | A1 | * | 4/2010 | Kondo et al. ................... | 290/44 |
| 2010/0286934 | A1 | * | 11/2010 | Kuehhorn et al. ............. | 702/56 |
| 2012/0173172 | A1 | * | 7/2012 | Laurberg et al. ............... | 702/56 |

FOREIGN PATENT DOCUMENTS

| | | |
|---|---|---|
| CN | 101482448 A | 7/2009 |
| WO | WO 2009000787 A2 | 12/2008 |
| WO | WO 2009068035 A2 | 6/2009 |

* cited by examiner

*Primary Examiner* — Gregory J Toatley
*Assistant Examiner* — Felix Suarez (57) ABSTRACT

A method of determining a common blade frequency of a rotor of a wind turbine is provided. The method includes measuring a vibration quantity representative of a vibration of a component of the wind turbine, and determining the common blade frequency based the measured vibration quantity.

13 Claims, 5 Drawing Sheets

METHOD OF AND DEVICE FOR DETERMINING A COMMON BLADE FREQUENCY OF A ROTOR OF A WIND TURBINE, AND METHOD OF OPERATING A WIND TURBINE

CROSS REFERENCE TO RELATED APPLICATIONS

This application claims priority of European Patent Office application No. 10177991.6 EP filed Sep. 21, 2010, which is incorporated by reference herein in its entirety.

FIELD OF INVENTION

The invention relates to the field of wind turbines, and in particular to a method of determining a common blade frequency of a rotor of a wind turbine, a method of operating a wind turbine, and a device for determining a common blade frequency of a rotor of a wind turbine.

ART BACKGROUND

In general, a wind turbine comprises a tower, a nacelle arranged on top of the tower, and a rotor. The rotor comprises a hub and blades, wherein the hub is configured rotatably around a rotational axis particularly corresponding to a longitudinal extension of the nacelle, and the blades are fixed to the hub and extend in a rotational plane being transverse, particularly perpendicular, to a longitudinal hub extension. The hub is connected to an electric generator configured for generating electric energy by e.g. a further rotor shaft and is thus configured for driving the electric generator.

A blade of the rotor of the wind turbine may perform a vibration during an operational or an idle mode of the wind turbine. Such a vibration is characterized by a blade frequency. In particular, a blade frequency may be a blade edge frequency corresponding to a vibration of an edge of the blade, for example a leading blade edge (facing a wind direction) or a trailing edge (pointing in the wind direction).

Knowledge about the blade frequency may allow for detecting a change in blade characteristics and for adapting an operational mode of the wind turbine.

In order to determine the blade edge frequency of one or more blades, a vibration of the blades may be measured using fast responsive sensors, such as accelerometers or strain gauges, which may placed in one or each of the blades of the rotor, and the respective blade edge frequency of the one of each of the blades may be deduced from the measured sensor signals.

It may be further known to use a predetermined blade edge frequency particularly for all blades of the rotor depending on the kind of used blade of the rotor, in order to manually set the blade edge frequency of a blade in a controller of the wind turbine. In this context, it may be assumed that the blade edge frequency of a particular blade may be comparatively constant for a specific class of blades such that the respective blade edge frequency may be selectable from the predetermined blade edge frequencies.

WO 2009/000787 A2 discloses a method for monitoring blade frequencies of each of the blades of a rotor of a wind turbine. Vibrations of a nacelle of the wind turbine as well as an azimuth angle of the blades may be measured. Blade edge frequencies for each of the blades may be determined based on these two quantities.

However, determination of a blade frequency, particular of a blade edge frequency, of one or more blades of a rotor using the above detailed techniques may result in a poor estimation of the blade frequency.

SUMMARY OF THE INVENTION

Accordingly, it may be an object of the invention to provide a method of determining a common blade frequency of a rotor of a wind turbine, a method of operating a wind turbine, and a device for determining a common blade frequency of a rotor of a wind turbine which may allow for an accurate determination of the common blade frequency of the rotor of the wind turbine.

In order to achieve the object defined above, a method of determining a common blade frequency of a rotor of a wind turbine, a method of operating a wind turbine, and a device for determining a common blade frequency of a rotor of a wind turbine according to the independent claims are provided.

According to an exemplary aspect of the invention, a method of determining a common blade frequency of a rotor of a wind turbine comprises measuring a vibration quantity representative of a vibration of a component of the wind turbine, and determining the common blade frequency based on the measured vibration quantity.

According to another exemplary aspect of the invention, a method of operating a wind turbine comprises determining a common blade frequency according to a method as described above, and adapting an operational mode of the wind turbine based on the determined common blade frequency.

According to another exemplary aspect of the invention, a device for determining a common blade frequency of a rotor of a wind turbine comprises a measuring unit configured for measuring a vibration quantity representative of a vibration of a component of the wind turbine, and a determining unit configured for determining the common blade frequency based on the measured vibration quantity.

In the context of the present application, the term "common blade frequency" may particularly denote a frequency corresponding to a common vibration or vibrational movement of (particularly members) of the rotor of the wind turbine. In particular, the common frequency may denote a ground frequency or eigen frequency of the vibration(s) of (particularly the members of) the rotor and/or may denote at least one harmonic frequency of the ground frequency of the vibration(s) of (particularly the members of) the rotor. The common blade frequency may also denote a superposition of frequencies (e.g. ground frequencies and/or harmonic frequencies) of (particularly the members of) the rotor. In particular, the common blade frequency may particularly result from a common vibration of blades of the rotor, wherein a vibration of a hub of the rotor may be negligible. In particular, the common blade frequency may particularly denote a common blade edge frequency which may result from a common vibration of edges of the blades of the rotor, wherein the edges of the blades may be at least part of leading edges (facing the wind direction) and/or at least part of trailing edges (pointing in the wind direction) of the blades.

In particular, the term "determining a common blade frequency" may particularly denote determining or evaluating a frequency value of a common blade frequency. In particular, the frequency value of the common blade frequency may be time invariant or not changing with time.

In particular, the term "member" of the rotor may particularly a hub of the rotor and (particularly different) blades of the rotor which may be attached to the hub.

The term "common vibration" of the rotor may particularly denote a vibration or vibrational movement of the rotor, particularly of the members of the rotor. In particular, a common vibration of the members of the rotor may result from interactions between vibrations of the different members of the rotor, wherein the members of the rotor may not necessarily show identical vibration characteristics.

The term "vibration quantity" may particularly denote a measurable quantity resulting from a vibration of the component. In particular, a vibration quantity may be representative of a displacement of the component, particularly a bending of the component, and a movement of the component, or an acceleration of the component.

The term "operational mode" of a wind turbine may particularly denote an idle mode and a rotational mode. In particular, an idle mode may particularly denote a state in which the rotor of the wind turbine may be in a standby mode or shutdown mode, and thus a hub and blades of the rotor may not rotate around a respective rotational axis of the rotor. In particular, a rotational mode of the wind turbine may particularly denote a state in which the rotor of the wind turbine may be in service, and thus the hub and the blades of the rotor may rotate around the rotational axis of the rotor.

According to the exemplary aspects of the invention described above, a determination of a common blade frequency of a rotor may use the approach that the rotor may perform a common vibration owing to mutual interactions between members of the rotor. Thus, a common vibration of the rotor may effect a vibration of the component of the wind turbine, such that a corresponding vibration quantity of the component of the wind turbine may be measured as a measure for the common blade frequency. The common blade frequency may be determined based on the measured vibration quantity.

In contrast, prior art methods may use an approach that each of the members of the rotor separately vibrate at different blade frequencies, although a vibration of the component of the wind turbine may be representative of each of the separate vibrations of the members of the rotor.

Assuming a common blade frequency of the rotor instead of multiple blade frequencies of the members of the rotor may represent a more realistic approach, thereby allowing for extracting a more accurate and reliable blade frequency of the rotor as basis for adapting an operational mode of the wind turbine. Thus, adapting the operational mode of the wind turbine may be significantly improved as compared to prior art.

Next, further exemplary embodiments of the method of determining a common blade frequency of a rotor of a wind turbine will be explained. However, these embodiments also apply to the method of operating a wind turbine and the device for determining a common blade frequency of a rotor of a wind turbine.

The component of the wind turbine may be at least one of a nacelle of the wind turbine, and a tower of the wind turbine. The particularly conventional kind of measuring the vibration quantity may allow for a simplified determination of the common blade frequency, since no additional measurement equipment may have to be implemented in the wind turbine. In particular, the methods and device according to the exemplary embodiments may be used in connection with already existing wind turbines.

In particularly, the vibration quantity may be representative of at least one of a displacement of the component of the wind turbine (e.g. a bending of the tower of the wind turbine particularly in one or more directions and/or a movement of the nacelle particularly in one or more directions), a velocity of the component (e.g. a velocity of the nacelle or the tower particularly in one or more directions), and an acceleration of the component of the wind turbine (e.g. an acceleration of the nacelle particularly in one or more directions and/or an acceleration of the tower particularly in one or more directions).

In particular, the measuring of the vibration quantity may be performed along a nacelle extension, or transverse, particularly perpendicular, to the nacelle extension, or in any direction in between these directions.

The measuring of the vibration quantity may comprise measuring the vibration quantity using an accelerometer or a strain gauge. These conventional measurement equipments configured for measuring a displacement and/or an acceleration of the component of the wind turbine may be easily implemented in the wind turbine without significant constructive modifications of the design of the wind turbine (if not yet present), thereby further simplifying the step of measuring the vibration quantity.

In particular, the accelerometer or the strain gauge may be arranged in or at the tower (particularly in a position adjacent to an upper ending portion of the tower), on or at the nacelle of the turbine (particularly at a bottom position adjacent to the upper ending portion of the tower), or in or at the hub of the turbine (particularly at a position adjacent to the blades or at a position spaced away from the blades).

In particular, the vibration quantity may be measured during a time period at several time steps or points.

The method may comprise measuring a quantity representative of a rotational angle value of a rotational angle of the rotor, wherein the determining of the common blade frequency is further based on the quantity representative of the rotational angle value. The term "rotational angle" may particularly denote a rotational angle of (particularly at least one blade of) the rotor defined in a rotational plane of blades of the rotor. In particular, the rotational plane may be defined as a plane in which the blades of the rotor may extend and rotate around the rotational axis. In particular, the rotational plane may be defined as a plane being transverse, particularly perpendicular, to a rotational axis of the blades of the rotor and extending through portions of at least a part of the blades particularly in a case in which the blades may be inclined with respect to a plane being perpendicular to the rotational axis of the blades and thus may comprise non zero pitch angles. In particular, the rotational plane of the rotor May be arranged transverse, particularly perpendicular, to an extension of the hub of the rotor and/or a nacelle extension. Thus, a second measured quantity may be used for determining the common blade frequency, thereby improving the accuracy of the determined common blade frequency.

In particular, the quantity representative of the rotational angle value may be measured during a time period at several time steps or points.

In particular, the rotational angle quantity may be measured in spherical coordinates, wherein the rotational angle may be defined in the rotational plane particularly being defined by two coordinate directions (e.g. Cartesian coordinate directions such as x, y directions being perpendicular to one other).

In particular, the rotational angle (value) may be combined with, particularly by adding, a (real) number which may particularly account for an angle offset position of a blade with respect to an origin of the rotational angle or may account for an arbitrary angle position of the blades.

The rotor may comprise at least two blades, wherein the measuring of the quantity representative of the rotational angle value comprises measuring an azimuth angle value of an azimuth angle of at least one of the blades of the rotor, a rotor rotational speed value of a rotor rotational speed of the rotor, or a generator rotational speed value of a generator rotational speed of a generator of the wind turbine.

Thus, the measuring of the azimuth angle value may be performed using an azimuth angle sensing unit which may be particularly arranged at or in a blade of the rotor. In particular, the azimuth angle sensing unit may also serve for pitch control of a blade of the rotor. In particular, azimuth angle sensing units may be provided for each of the blades of the rotor. In particular, an azimuth angle of the blades may correspond to a rotational angle of the blades, thereby providing a simple and accurate measure for measuring the quantity representative of the rotational angle value.

Basing the measuring of the rotational angle value on measuring the generator rotational speed or the rotor rotational speed may provide another simple and accurate measure for determining a rotational angle value of the rotor. In particular, integrating the generator rotational speed or the rotor rotational speed may result in a rotor shaft position from which the position of a blade of the rotor and thus a rotational angle of (particularly the blade of) the rotor may be deduced. In particular, the generator rotational speed may correspond to the rotor rotational speed being multiplied with a constant.

In particular, the azimuth angle value, the rotor rotational angle value, and the generator rotational angle value may be measured during a time period at several time steps or points.

The determining of the common blade frequency may comprise multiplying the vibration quantity with a trigonometric function of a term related to the rotational angle quantity (particularly combined with the number). In particular, a trigonometric function may comprise a cosine function or sine function with the rotational angle quantity being the argument. Thus, modulation of the vibration quantity with respect to a particular direction may be achieved.

The determining of the common blade frequency may comprise performing a frequency analysis of the vibration quantity. In particular, a Fast Fourier Transformation or a Discrete Fast Fourier Transformation (FFT or DFFT) or a Phase Locked Loop (PLL) oscillation on the vibration quantity (particularly multiplied with the trigonometric function) may be used for further frequency analysis of the vibration quantity. In particular, a FFT or DFFT may be used for determining the common blade frequency in the frequency domain. In particular, a PLL may be used for determining the common blade frequency in the time domain. In particular, a PLL may synchronize an internal oscillator signal with the vibration quantity. In particular, when the PLL may be synchronized, the PLL oscillator frequency may be equal to the common blade frequency or any determined frequency quantity representative of a blade (edge) frequency of one blade.

The rotor may comprise at least two blades, wherein the determining of the common blade frequency may comprise determining a respective frequency quantity representative of a vibration of each of the blades, and averaging the determined respective frequency quantities. Thus, for each of the blades a blade frequency quantity may be determined which may be representative of a vibration of the respective blade, and these blade frequency quantities may be (particularly weighted) averaged. The common blade frequency may be based on a mean value of each of the blade edge frequency quantities. Therefore a very simple technique of determining the common blade frequency of the rotor may be provided.

In particular, a superposition of the blade frequency quantities of each of the blades may be used for determining the common blade frequency of the rotor. In particular, any coefficients and signs for each of the blade frequency quantities may be used.

The rotor may comprise at least two blades, wherein the determining of the common blade frequency may comprise determining a frequency quantity representative of the common vibration of the rotor. This measure may allow for a direct determination of the common blade frequency having low signal processing complexity.

In particular, determining the (respective blade) frequency quantity may be based on determining in a frequency spectrum of the vibration quantity a frequency quantity or value which may correspond to a vibration quantity of maximum signal. In particular, the term "frequency spectrum of the vibration quantity" may particularly denote a spectrum with abscissa values being frequency values and ordinate values being or corresponding to the vibration quantity. In particular, determining a frequency quantity which may correspond to a vibration quantity of maximum signal may comprise using an "argument of the maximum" function (argMax).

The measuring of the vibration quantity may comprise measuring the vibration quantity in an idle mode of the wind turbine. In particular, the common blade frequency may then correspond to a flap frequency of the rotor. In particular, since the rotor of the wind turbine may not rotate in the idle mode, a frequency spectrum of the vibration quantity may comprise one (broad) peak with the frequency quantity corresponding to a vibration quantity of maximum signal in the frequency range of the peak being equal to or approximating the common blade frequency. Thus, an accurate and simple approximation of the common blade frequency may be provided.

The measuring of the vibration quantity may comprise measuring the vibration quantity during a (particularly limited or short) time period, wherein the determining of the common blade frequency may comprise averaging vibration quantities at frequency quantities associated with a frequency quantity and a rotor rotational frequency of the rotor. In particular, the term "rotor rotational frequency" may particularly denote a rotational frequency of the rotor corresponding to a set or predetermined rotational speed of the rotor. Here, it may be assumed that the rotor rotational speed may be constant within a short time period. A respective frequency spectrum of the vibration quantity may comprise two (broad) peaks with the frequency quantities corresponding to vibration quantities of maximum signal in the frequency range of the peaks being associated with the common blade frequencies and the rotor rotational speed. In particular, peak centers of each of the two peaks may be at frequency quantities corresponding to the common blade frequency plus/minus the rotor rotational frequency. Averaging signal values at frequency quantities or values associated with a frequency quantity or value and a rotor rotational frequency (value) of the rotor may result in a good estimation of the common blade frequency in that a resulting frequency spectrum may comprise one peak whose centre frequency value may be associated with the common blade frequency. Thus, a very easy and accurate way of determining the common blade frequency may be provided.

In particular, determining a frequency quantity may comprise at least one of numerically comparing vibration quantity signal values particularly in the peak frequency range, and fitting a function (for example, a Gaussian function) to a frequency spectrum of the vibration quantity particularly in a frequency range of the peak and extracting a frequency quantity corresponding to peak center position from the fit.

In particular, the term "frequency quantity" may denote a frequency value.

Next, further exemplary embodiments of the method of operating a wind turbine will be explained. However, these embodiments also apply to the method of determining a common blade frequency of a rotor of a wind turbine and the device for determining a common blade frequency of a rotor of a wind turbine.

In particular, adapting an operational mode of the wind turbine may comprises at least one of setting the wind turbine in a shutdown mode, setting the wind turbine in a standby mode, and changing a rotor rotational speed.

A rotor of the wind turbine may comprise at least two blades, wherein the common blade frequency may be indicative of at least one of a mass distribution of at least one blade and a shape of the at least one blade. In particular, when a change in a mass distribution and/or a shape of the at least one blade may occur, the common blade frequency may accordingly change, thereby indicating the occurred change in the at least one blade. In particular, based on the detected change of the determined common blade frequency the adapting of the operational mode of the wind turbine may be significantly improved, since a direct measure for changes in the at least one blade may be provided.

In particular, the determined common blade frequency may be used for ice detection particularly when ice may be formed on at least one blade of the rotor, thereby changing the mass distribution and/or the shape of the at least one blade. In particular, the determined common blade frequency may be used for crack detection of at least one blade of the rotor. In particular, the determined common blade frequency may be used for estimating a load of at least one blade of the rotor. In particular, the determined common blade frequency may be used for classifying at least one blade of the rotor. In particular, the determined common blade frequency may be used for an automatically detection of a blade repair requirement. In particular, the determined common blade frequency may be used as an input parameter for a unit configured for adapting, particularly decreasing, a rotation speed of the rotor, particularly for a rotor speed avoider.

In particular, at least one of the above mentioned applications may be used in the method of operating the wind turbine.

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

DETAILED DESCRIPTION

The illustration in the drawing is schematic. It is noted that in different figures, similar or identical elements are provided with the same reference signs or with reference signs, which are different from the corresponding reference signs only within the first digit.

Figure 1A:
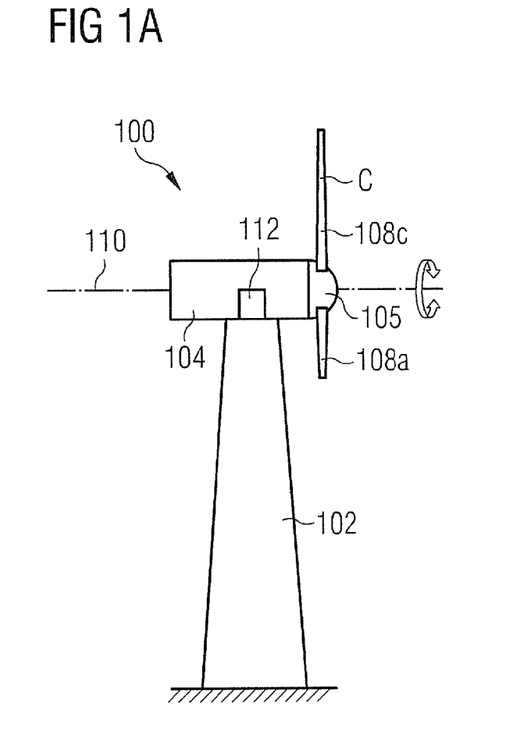
FIG. 1A illustrates a perspective view of a wind turbine.

Referring to FIG. 1A, a wind turbine 100 is illustrated. The wind turbine 100 comprises a tower 102 on which a nacelle 104 is mounted. A front portion of the nacelle 104 is formed as a rotor 105 comprising a hub 106 and three blades 108a-c. The hub 106 extends along a longitudinal direction 110 of the nacelle 104, and the blades 108a-c are mounted in a plane 111 perpendicular to the longitudinal direction 110 of the nacelle 104. However, it is also possible that the plane 111 is inclined with respect to the longitudinal direction 110 of the nacelle 104. The hub 105 is connected to a generator via a gearbox. Both the generator and the gearbox are arranged within the nacelle 104.

Figure 1B:
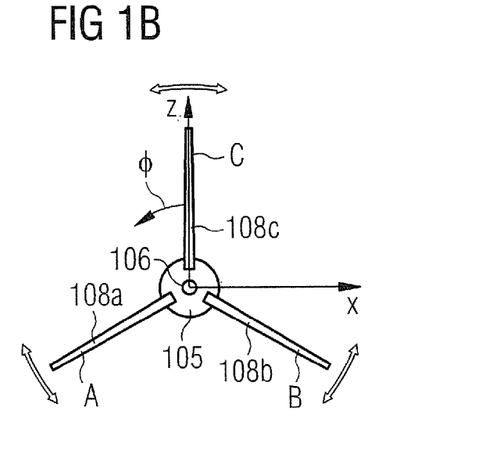
FIG. 1B illustrates a front view of a nacelle of the wind turbine in FIG. 1A.
Figure 1C:
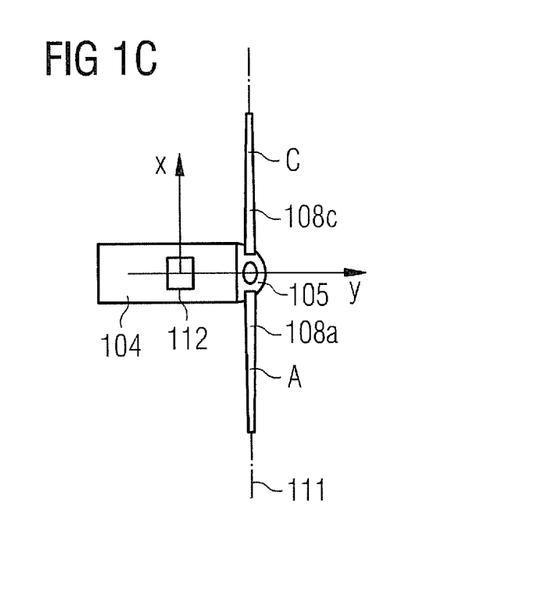
FIG. 1C illustrates a plane view of the nacelle of the wind turbine in FIG. 1A.

An accelerometer 112 is placed on top of the tower 102 within the nacelle 104. An azimuth angle sensor configured for sensing an azimuth angle of one of the blades 108a-c is placed in one of the blades 108a-c, wherein the azimuth angle is identical to a rotational angle $\phi(t)$ of the blades 108a-c measured within the rotational plane 111. Alternatively, each of the blades 108a-c may comprise an azimuth angle sensor. The rotational angle $\phi(t)$ is measured in spherical coordinates with Cartesian coordinate axes x, z defining the rotational plane 111 of the blades 108a-c and being perpendicular to the longitudinal extension of the nacelle 104 and/or a hub extension along the y direction 110. Further, a position of each of the blades 108a-c with respect to one another is defined by a phase number $\phi$ measured from a zero point of the rotational angle $\phi(t)$. For instance, the blade 108a may comprises the phase value $\phi=0°$, the blade 108b comprises the phase value $\phi=120°$ and $\frac{2}{3}\pi$, respectively, and the blade 108c comprises the phase value $\phi=240°$ and $\frac{4}{3}\pi$, respectively.

A device for determining a common blade frequency of the blades 108a-c of the rotor 105 comprises the accelerometer 112 and the azimuth angle quantity sensor mounted within one of the blades 108a-c. The device may be arranged within the wind turbine 100, particularly within the tower 102 or the nacelle 104, or may be located externally of the wind turbine 100.

In the following, exemplary embodiments of methods of and devices 218a, b, 418a, b for determining a common blade frequency of the blades 108a-c of the wind turbine 100 will be explained with reference to FIG. 2A-4B.

Figure 2A:
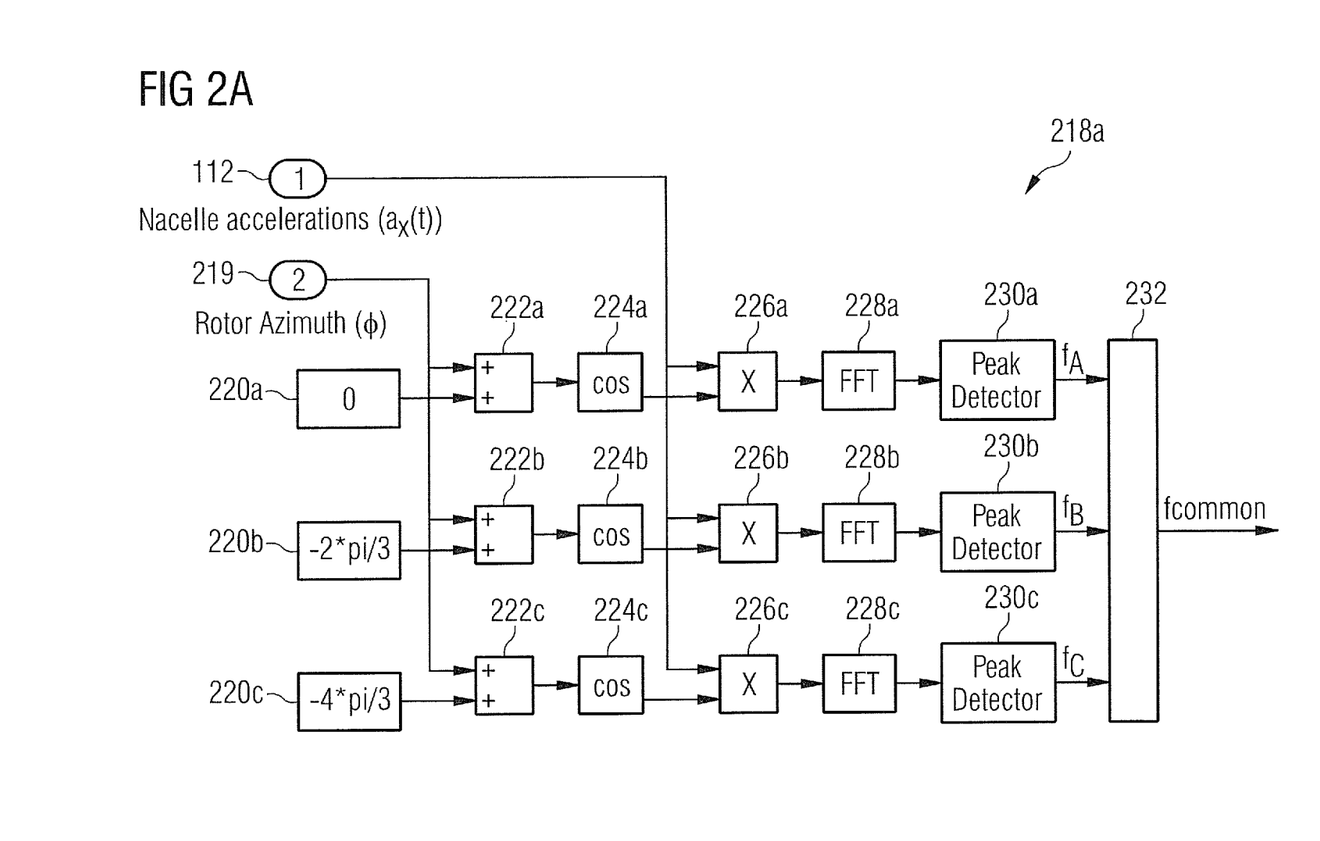
FIG. 2A illustrates a device for determining a common blade frequency of a rotor of the wind turbine in FIG. 1A according to a first exemplary embodiment of the invention.

Referring to FIG. 2A, a first exemplary embodiment of a respective method and a respective device 218a will be explained. In a first step, the blade edge frequencies of each of the blades 108a-c are determined using a method of monitoring blade frequencies of a wind turbine and a monitoring system for performing this method as described in WO 2009/000787 A2. The common blade frequency is calculated as a mean value of the determined blade edge frequencies.

As detailed in WO 2009/000787 A2, the blade edge frequencies of the blades 108a-c are determined by the following two techniques:

A nacelle acceleration in the x-direction is measured by the accelerometer 112, and a rotational angle, namely the azimuth angle, is sensed by the azimuth angle sensor. The cosine values of the azimuth angle are multiplied with the measured nacelle acceleration in the x-direction (modulation). By using the cosine values of the azimuth angle primarily the vibrations in the x-direction of each blade is monitored. This is done with basis in the theory that the frequencies of the blade edge (in the x-direction) have the largest influence on the nacelle 104 with the accelerometer 112, when the blades 108a-c are in a vertical position (0 or 180 degrees) and almost no influence in the horizontal position (90 or 270 degrees). By using the blade frequencies corresponding to a displacement of the blades 108a-c of respectively 0 degrees, 120 degrees and 240 degrees (in a typical three bladed wind turbine), and applying a Fast Fourier Transformation (FFT) to the modulated accelerometer sensor signals, the blade edge frequencies of each blade 108a-c are monitored.

Alternatively, the measured vibrations from the accelerometer 112 in the y-direction (along the nacelle extension 110) are used to calculate each blade edge frequency. Here, it is not suitable to use the cosine values of the azimuth angle, as the blades 108a-c vibrate in the y-direction during the whole 360 degree of rotation. But as the moment load of the tower 102 is larger in the top vertical position of the blades 108a-c than in the bottom vertical position of the blades 108a-c, it would be suitable to multiply the sensed vibration with a function simulating these circumstances, like a constant number (e.g. number 1) added to the cosine value of the azimuth angle $\phi$ and then dividing this number with 2 ((1+cosine (azimuth angle $\phi$))/2). This function gives a number between 1 and 0 in the range of 0 and 360 degrees, and thereby extracting each blade edge frequency as further described above.

Looking at the x-direction, it is assumed that the acceleration of the nacelle 104 is a measure for the edgewise resonance frequency of each of the blades 108a-c which may be described by the formulas $$a_A(t) = k^* \cos(\omega_A^* t)$$

$$a_B(t) = k^* \cos(\omega_B^* t)$$

$$a_C(t) = k^* \cos(\omega_C^* t)$$

with A, B, C denoting the blades 108a-c, respectively, a(t) denoting the blade acceleration edgewise, $\omega$ denoting the edge wise resonance angular frequency of the blades 108a-c, t denoting the time, and k denoting a constant. The frequency f is linked with the angular frequency $\omega$ via the relation $\omega = 2\pi f$.

The edge vibrations in the blade 108a-c are coupled into the nacelle 104 with a 1p modulation (once per revolution modulation). Assuming that the blade edge vibrations couple most with the nacelle 104, when the blades 108a-c have a vertical position, the nacelle vibrations may be approximated by $$a_x(t, \phi) = \left( a_A(t)\cos(\phi) + a_B(t)\cos\left(\phi - \frac{2}{3}\pi\right) + a_C(t)\cos\left(\phi - \frac{4}{3}\pi\right) \right) k_2,$$

wherein $a_x(t,\phi)$ denotes the nacelle acceleration, $a_A$ denotes the blade 108a/A acceleration edgewise, $a_B$ denotes the blade 108b/B acceleration edgewise, $a_C$ denotes the blade 108c/C acceleration edgewise, $\phi$ denotes the rotor azimuth angle and $k_2$ denotes a constant.

Figure 3A:
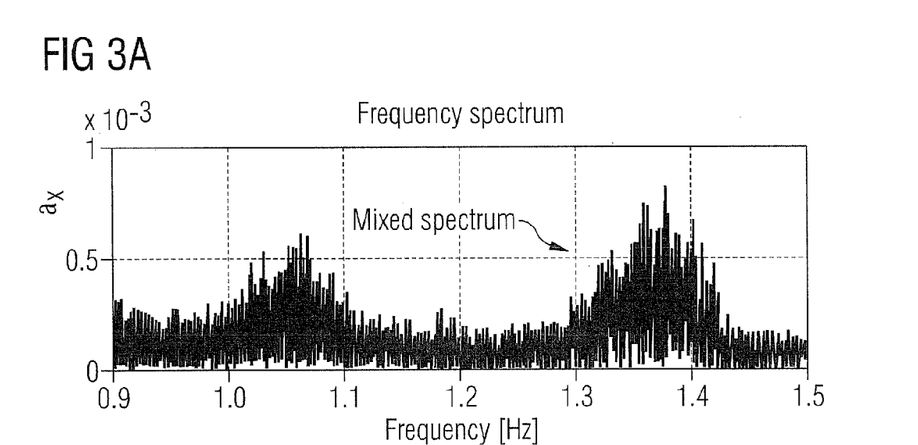
FIG. 3A illustrates a graph showing a frequency spectrum of an acceleration of a nacelle of the wind turbine in FIG. 1A.

A frequency spectrum of $a_X$ is depicted in FIG. 3A. The frequency spectrum may be obtained using a FFT or a DFFT.

Modulation of the $a_x(t,\phi)$ signal again with respect to the individual blade position gives three new signals defined by $$am_A = a_X \cos(\phi)$$

$$am_B = a_X \cos\left(\phi - \frac{2}{3}\pi\right)$$

$$am_C = a_X \cos\left(\phi - \frac{4}{3}\pi\right)$$

Figure 3B:
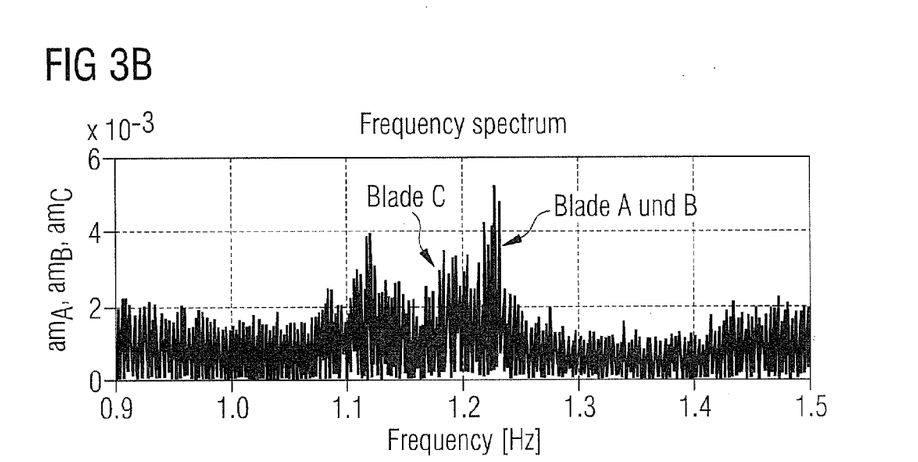
FIG. 3B illustrates a graph showing another frequency spectrum of the acceleration of the nacelle of the wind turbine in FIG. 1A.

FIG. 3B illustrates the frequency spectra $am_{A-C}$ of the blades 108a-c/A-C. Signal peaks are seen at about 1.19 Hz and at about 1.22 Hz. Here, a frequency value associated with a centre of the peak at 1.19 Hz corresponds to the blade frequency of the blade 108c/C, and frequencies associated with the centres of the peaks at 1.22 Hz correspond to the blade frequencies of the blades 108a, b/A, B. It is noted that the blade frequencies of the blades 108a, b/A, B are approximately identical.

The frequency peaks may be found in the frequency domain, using a FFT or DFFT. The FFT data could then be smoothed using a filter and a frequency corresponding to a maximum signal value could be the blade edge frequency. The frequency peak could also be detected in the time domain, using a Phase Locked Loop (PPL) which synchronizes an internal oscillator with the $am_{A-C}$ signal. When the PPL is synchronized, the PPL oscillator frequency will be equal to the blade edge frequency.

The common blade frequency $f_{common}$ is found by taking the mean of the extracted blade edge frequencies $f_A$, $f_B$, $f_C$ using $$f_{common} = \frac{f_A + f_B + f_C}{3}.$$

The respective devices 218a, b for determining the common blade frequency will be explained in the following with reference to FIG. 2A, 2B.

An acceleration $a_X(t,\phi)$ of the nacelle 104 is measured along the x-direction using the accelerometer 112. The azimuth angle $\phi$ is sensed for the blades 108a-c using an azimuth angle sensor 219. A respective phase $\phi$ for each of the blades 108a-c stored in memory units 220a-c and the measured rotational angle $\phi$ of the blades 108a-c are inputted to adding units 222a-c, in order to account for the different blade angle positions with respect to one another. An output of the adding units 222a-c are inputted to a cosine function unit 224a-c which multiplies a cosine function related to the measured azimuth angle $\phi$ and the respective phase $\phi$. The output of the cosine function units 224a-c and the measured nacelle acceleration $a_X(t,\phi)$ are inputted to multiplying units 226a-c each of which multiply both quantities for calculating $am_{A-C}$.

A Fast Fourier Transformation is applied on the output of the multiplying unit 226a-c by a Fast Fourier Transformation unit 228a-c. The respective blade edge frequencies $f_A$, $f_B$, $f_C$ of the blades 108a-c are determined by peak detectors 230a-c which are configured for extracting the blade edge frequencies of the blades 108a-c as the frequency having a maximum signal in the spectrum of FIG. 3B.

The derived blade edge frequencies $f_A$, $f_B$, $f_C$ are inputted to an averaging unit 232 which is configured for averaging these frequencies $f_A$, $f_B$, $f_C$ by taking a mean value thereof.

An output of the averaging unit 232 corresponds to the common blade frequency $f_{common}$.

Figure 2B:
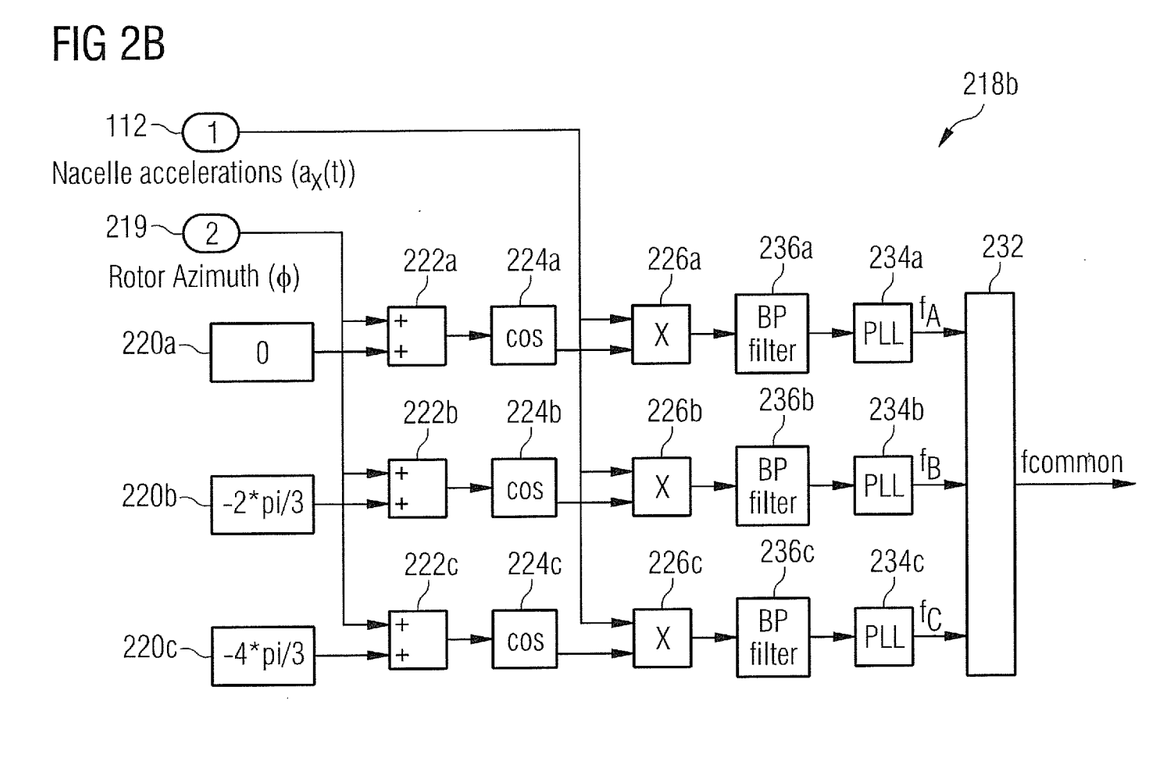
FIG. 2B illustrates another device for determining a common blade frequency of a rotor of the wind turbine in FIG. 1A according to the first exemplary embodiment of the invention.

As Illustrated in FIG. 2B, a phase locked loop instead of a Fast Fourier Transformation is applied to the output of the multiplying units 234a-c. Further, bandpass filters 236a-c are located between the multiplying units 226a-c and the PLL units 234a-c configured for filtering the modulated signals before inputting them into the respective PLL units 234a-c.

A second exemplary embodiment of the method of and the devices 418a, b for determining the common blade frequency of the blades 108a-c will be explained with reference to FIG. 4A, 4B.

For this method and devices 418a, b, it is assumed that the blades 108a-c vibrate at a common frequency, wherein the common vibration results from an interaction of vibrations of each of the blades 108a-c with one another.

In analogy to the formulas as given above, it is assumed that the nacelle acceleration is given by $$T_{sig}(t)=k*\sin(\omega_{common}*t)\sin(\phi(t)+\varphi)$$

with $T_{sig}(t)$ denoting the nacelle acceleration, $\omega_{common}$ denoting the common blade angular frequency, $\phi$ denoting the rotational or azimuth angle of the rotor 105, $\varphi$ denoting a phase with $0 \le \varphi \le 2\pi$, and k a constant.

Modulation with a sine function related to the azimuth angle $\phi$ and the phase $\varphi$ results in the following vibrational quantity $$T_{demod}(t,\varphi)=T_{sig}(t)*\sin(\phi(t)+\varphi).$$

Solving the equation $$[f_{common,est},\varphi]=\arg \text{Max}\{|\Sigma \exp(2\pi i f_{common} t)*T_{demod}(t,\varphi)|\}$$

results in the estimated common blade frequency $f_{common,est}$ and the phase $\varphi$. Here, arg Max denotes an "argument of the maximum" function. The sum corresponds to the Fourier transformation with the sum taken over the time t. It is noted that solving the latter equation comprises a low degree of complexity and may be easily executed brute force. Further, selecting $\varphi$ equal to 0, 120 degree, and 240 degree results in equivalent formulas as detailed above in connection with the first exemplary embodiment.

The rotational angle $\phi$ is approximated by a quantity $\phi'(t)$ by means of integrating a generator rotational speed $v_{gen}$ of a generator of the wind turbine 100 or a rotor rotational speed $v_{rot}$ of the rotor 105 of the wind turbine 100 using $$\phi(t) \approx \int v_{gen}=A*\int v_{rot}=\phi'(t)+c.$$

A denotes a multiplying factor resulting from a gearbox arranged between the hub 106 of the rotor 105 and the generator. c denotes an integration constant. Accordingly, this change in the algorithm allows not to use the actual azimuth angle $\phi(t)$, but to use a summed version of the generator speed, since the accumulated or integrated generator speed corresponds to the rotor position added with an unknown constant. The rotor position can be than transformed into the quantity $\phi'(t)$ indicative of the rotational angle $\phi(t)$. Instead of using the rotational angle $\phi(t)$ determined based on a generator rotational speed or a rotor rotational speed, an azimuth angle of one of the blades 108a-c can be measured using an azimuth angle sensor.

Since the phase $\varphi$ does not correspond to a physical position of one of the blades 108a-c, multiple frequency spectra for different values $\varphi$ are calculated for solving the above mentioned equation. It is noted that the constant c may be combined with the phase value $\varphi$.

Respective graphs showing frequency spectra of the vibration quantity $T_{demod}(t,\varphi)$ for different values of $\varphi$ are equivalent to the graphs of FIG. 2B. In particular, each of these frequency spectra comprises one broad peak whose peak centre corresponds to the common blade frequency. In order to determine the common blade frequency from these multiple spectra, a frequency spectrum is selected from the multiple frequency spectra which comprises the highest signal values around the peak position. The common blade frequency value is determined (either for the selected frequency spectrum or all frequency spectra) as a frequency value defining the peak centre using, for example, a Gaussian approximation.

Figure 4A:
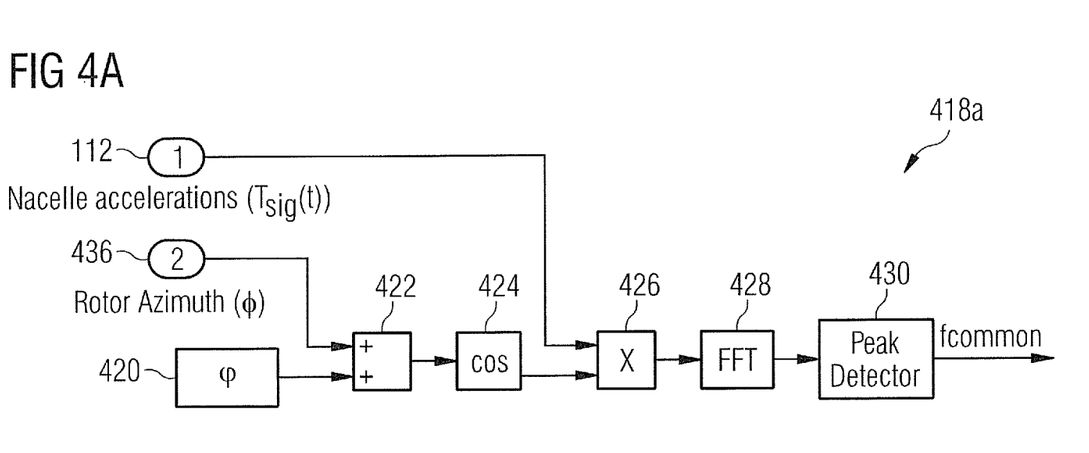
FIG. 4A illustrates a device for determining a common blade frequency of a rotor of the wind turbine in FIG. 1A according to a second exemplary embodiment of the invention.

Referring to FIG. 4A, the device 418a for determining the common blade frequency is illustrated in more detail. The accelerometer 112 is configured for measuring the nacelle acceleration $T_{sig}(t)$. The device 418a comprises a rotational angle determining unit 436 configured for determining a rotational angle of the rotor 105 based on a generator rotational speed. Accordingly, the device 418a further comprises a sensor configured for measuring the generator rotational speed, for example, a strain gauge. In a memory unit 420 multiple phases $\varphi$ are stored. An adding unit 422 is configured for adding the respective phase $\varphi$ and the rotational angle $\phi$. A sine function unit 424 is configured for applying a sine function to the output of the adding unit 422. The output of the sine function unit 424 and the measured nacelle acceleration $T_{sig}(t)$ are inputted to a multiplying unit 426 configured for multiplying both quantities. A Fast Fourier Transformation is applied on the output of the multiplying unit 426 by a Fast Fourier Transformation unit 428. A peak detector unit 430 is configured for extracting the common blade frequency $f_{common,est}$ as a frequency corresponding to a maximum signal in the frequency spectrum and the phase $\varphi$ as explained above. In particular, the peak detector 430 is configured for determining the common blade frequency by selecting the frequency value from the common blade frequency values whose associated frequency spectrum comprises the highest signal values in a region around the common blade frequency. Alternatively, the peak detector 430 is configured for first selecting the frequency spectrum comprising the highest signal values and for afterwards extracting the common blade frequency for the selected frequency spectrum.

Figure 4B:
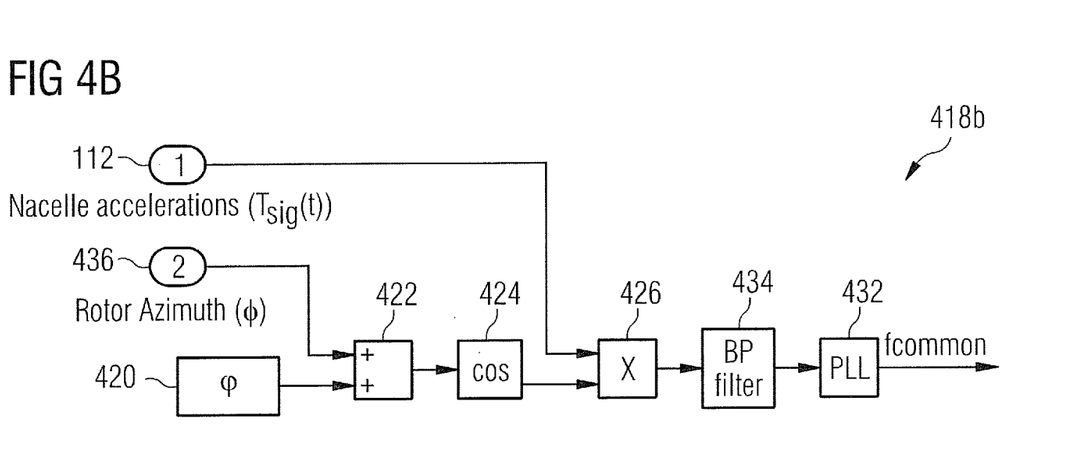
FIG. 4B illustrates another device for determining a common blade frequency of a rotor of the wind turbine in FIG. 1A according to the second exemplary embodiment of the invention.

As illustrated in FIG. 4B, a bandpass filter unit 434 and a PLL unit 432 may be used in the device 418b instead of the Fast Fourier Transformation unit 428 and the peak detector 430 of the device 418a.

In a third exemplary embodiment of the method of and the device for determining the common blade frequency of the blades 108a-c, the nacelle acceleration is measured within a short time period or window in which the driving rotor rotational speed of the rotor 105 and thus the rotor rotational frequency of the blades 108a-c is assumed to be constant. The rotor rotational frequency is denoted by $f_{rot}$.

The measured nacelle acceleration is multiplied with a trigonometric function related to the azimuth angle of the blades 108a-c and a phase. A respective graph showing a spectrum $T_{spec}(f)$ of the nacelle acceleration is equivalent to the graph of FIG. 3B. The frequency spectrum $T_{spec}(f)$ of the nacelle acceleration comprises two broad peaks at the frequencies $f_{common}-f_{rot}$ and $f_{common}+f_{rot}$.

The common blade frequency $f_{common}$ is determined as the frequency which maximizes the equation $$B_{spec}(f)=T_{spec}(f-f_{rot})+T_{spec}(f+f_{rot}).$$

Thus, signal values of $T_{sig}(t)$ at the frequencies $f-f_{rot}$ and $f+f_{rot}$ are summed. A respective frequency spectrum of $B_{sig}(t)$ comprises one broad peak at the common blade frequency $f_{common}$. A centre position of the peak corresponds to the common blade frequency value.

A respective device may comprise a accelerometer, an azimuth angle sensor configured for sensing an azimuth angle, a memory unit configured for storing a phase, an adding unit configured for adding the azimuth angle and the phase, a multiplying unit configured for multiplying the nacelle acceleration with a trigonometric function related to the azimuth angle and the phase, a FFT unit, an adding unit configured for adding signal values at the frequency values $f-f_{rot}$ and $f+f_{rot}$, and a peak detector.

Further, the device may comprise a rotational angle determining unit configured for determining a rotational angle of the rotor 105 based on a generator rotational speed instead of the azimuth angle sensing unit. The device may further comprise a sensor configured for measuring the generator rotational speed, for example, a strain gauge.

Further, the device may comprise a PPL unit and optionally a bandpass filter unit instead of the FFT unit, the adding unit, and the peak detector.

In a fourth exemplary embodiment of the method of and a device for determining the common blade frequency of the blades 108a-c, the nacelle acceleration is measured in an idle mode of the wind turbine 100 which corresponds to a standstill of the rotor 105. The common blade frequency corresponds to a flap frequency.

Measuring the nacelle acceleration and applying mathematical procedures as described above results in a frequency spectrum $T_{spec}(f)$ equivalent to that of FIG. 2B. However, such a frequency spectrum comprises only one broad peak. The common blade frequency is estimated at a frequency at which the spectrum $$B_{spec}(f) = T_{spec}(f)$$

maximizes. In an approximation, a peak center frequency corresponds to the common blade frequency. The peak centre frequency is determined by applying a Gaussian function to $B_{spec}(f)$.

A respective device may comprise an accelerometer, an azimuth angle sensor configured for sensing an azimuth angle, a memory unit configured for storing a phase, an adding unit configured for adding the azimuth angle and the phase, a multiplying unit configured for multiplying the nacelle acceleration with a trigonometric function related to the azimuth angle and a phase factor, a FFT unit, and a peak detector.

Further, the device may comprise a rotational angle determining unit configured for determining a rotational angle of the rotor 105 based on a generator rotational speed instead of the azimuth angle sensing unit. The device may further comprise a sensor configured for measuring the generator rotational speed, for example, a strain gauge.

Further, the device may comprise a PPL unit and optionally a bandpass filter unit instead of the FFT unit and the peak detector.

In addition to or alternative to the nacelle acceleration a nacelle movement and/or a tower bending may be measured by a suitable sensor with respect to the above described methods and devices.

In the following, a method of operating a wind turbine will be explained.

In a first step, the common blades frequency is determined using a method according to the exemplary embodiments as described above with reference to FIG. 2A-4B. Thereupon, an operational mode of the wind turbine 100 is adapted in terms of shutting down the wind turbine 100, setting the wind turbine 100 in a standby mode, or adapting the rotor rotational speed of the rotor 105 of the wind turbine 100.

For example, the common blade frequency may be used for ice detection applications, blade crack detection applications, applications regarding to an estimation of a blade load, blade classification applications, applications regarding an automatic detection of a blade repair requirement, and/or as input for a controller configured for controlling the rotor rotational speed of the rotor 105.

In an exemplary embodiment of the method of operating a wind turbine, a common blade frequency will be used for blade classification purposes in terms of verifying a blade length of one or more blades 108a-c of the rotor 105 of the wind turbine 100. In the following, it is assumed that the blade length is identical for all blades 108a-c of the rotor 105 resulting in a verification of the common blade length. However, it is also possible to verify a particular blade length in the case of the rotor 105 comprising blades 108a-c of different length.

The blade length of the blades 108a-c is manually set in the controller of the wind turbine 100. However, as the number of different blade classes and in particular the number of different blade length is steadily increasing, a wrong setting of the blade length in the controller with increased loads will result in a decreased performance of the wind turbine 100, e.g. in a decreased power output. However, since the reduction of the performance is low, it may not be detected. A determination of the common blade frequency of the blades 108a-c is a suitable method of determining a blade class and verifying the blade length of the used blades 108a-c. Accordingly, a blade length of the blades 108a-c is manually adapted in the controller based on knowledge of a relation between the common blade frequency and the blade length.

It should be noted that the term "comprising" does not exclude other elements or steps and the use of articles "a" or "an" does not exclude a plurality. Also elements described in association with different embodiments may be combined. It should also be noted that reference signs in the claims should not be construed as limiting the scope of the claims.

The invention claimed is:

1. A method regarding a wind turbine, the method comprising:
    determining a common blade frequency resulting from a common vibrational movement due to mutual interactions between members of a rotor in a wind turbine, the wind turbine comprising a tower, a nacelle, and a plurality of rotatable blades, each rotatable blade having a blade edge frequency;
    measuring, using an accelerometer or a strain gauge, a vibration quantity indicative of a vibration of the tower or nacelle of the wind turbine,
    wherein the determining of the common blade frequency is performed by way of signal processing in a frequency domain or in a time domain with a determining unit and a peak detector, wherein the common blade frequency is based on the measured vibration quantity, and wherein the determining of the common blade frequency comprises:
        determining a respective frequency quantity indicative of a vibration of each of the plurality of rotatable blades, and
        calculating an average of the determined respective frequency quantities of the plurality of rotatable blades, the calculated average indicative of the common blade frequency, wherein the peak detector determines at least in part the common blade frequency by selecting a frequency value from blade edge frequency values whose associated frequency spectrum comprises a highest signal value in a region around the common blade frequency, wherein the frequency spectrum of the vibration quantity comprises at least one peak corresponding to a vibration quantity having a maximum signal in a frequency range of the peak being equal to or approximating the common blade frequency, and setting in a controller of the wind turbine an operational mode of the wind turbine based on the determined common blade frequency, the setting of the operational mode comprising at least one of setting the wind turbine in a shutdown mode, setting the wind turbine in a standby mode, and changing a rotor rotational speed.

2. The method according claim 1, the method further comprising:

measuring a quantity representative of a rotational angle value of a rotational angle of the rotor, wherein the determining of the common blade frequency is further based on the quantity representative of the rotational angle value.

3. The method according claim 2, wherein the measuring of the quantity representative of the rotational angle value comprises measuring an azimuth angle value of an azimuth angle of at least one of the blades of the rotor, a rotor rotational speed value of a rotor rotational speed of the rotor, or a generator rotational speed value of a generator rotational speed of a generator attached to the blades.

4. The method according claim 1, wherein the determining of the common blade frequency comprises multiplying the vibration quantity with a trigonometric function of a term related to a rotational angle quantity indicative of a rotational angle of the rotor.

5. The method according claim 1, wherein the determining of the common blade frequency comprises performing a frequency analysis of the vibration quantity.

6. The method according claim 1, wherein the determining of the common blade frequency comprises determining a frequency quantity representative of a common vibration of the plurality of blades.

7. The method according to claim 6, wherein the measuring of the vibration quantity comprises measuring the vibration quantity in an idle mode of the wind turbine.

8. The method according claim 1, wherein the measuring of the vibration quantity comprises measuring the vibration quantity during a time period, and wherein the determining of the common blade frequency comprises averaging vibration quantities at frequency quantities associated with a frequency quantity and a rotor rotational frequency of the rotor measured at a predefined rotational speed of the rotor.

9. The method according to claim 1, wherein the common blade frequency is indicative of at least one of a mass distribution of at least one blade, and a shape of the at least one blade.

10. The method according claim 1 further including adapting an operational mode of the wind turbine based on the determined common blade frequency.

11. The method according claim 10 wherein the adapted operational mode comprises at least one of a shutdown mode, and a standby mode.

12. A system for a wind turbine, the system comprising:

a device for determining a common blade frequency resulting from a common vibrational movement due to mutual interactions between members of a rotor of a wind turbine, the wind turbine comprising a tower, a nacelle, and one or more rotating blades, the device comprising:

a measuring unit configured to measure a vibration quantity representative of a vibration of a component of the wind turbine;

a determining unit and a peak detector configured to determine the common blade frequency based on the measured vibration quantity, wherein the determining unit is configured to determine a respective frequency quantity representative of a vibration of each of the plurality of rotatable blades, and is further configured to calculate an average of the determined respective frequency quantities of the plurality of rotatable blades, the calculated average indicative of the common blade frequency wherein the peak detector at least in part determines the common blade frequency by selecting a frequency value from blade edge frequency values whose associated frequency spectrum comprises a highest signal value in a region around the common blade frequency, wherein the frequency spectrum of the vibration quantity comprises at least one peak corresponding to a vibration quantity having a maximum signal in a frequency range of the peak being equal to or approximating the common blade frequency; and a controller configured to set an operational mode of the wind turbine based on the determined common blade frequency, the operational mode of the wind turbine comprising at least one of a shutdown mode, a standby mode, and a change in a rotor rotational speed.

13. A method regarding a wind turbine, the method comprising:

determining a common blade frequency resulting from a common vibrational movement due to mutual interactions between members of a rotor in a wind turbine, the wind turbine comprising a tower, a nacelle, and a plurality of rotatable blades, each rotatable blade having a blade edge frequency;

wherein the determining of the common blade frequency is performed by way of signal processing in a frequency domain or in a time domain with a determining unit and a peak detector, wherein the determining of the common blade frequency comprises:

determining a respective frequency quantity indicative of a vibration of each of the plurality of rotatable blades, and calculating an average of the determined respective frequency quantities of the plurality of rotatable blades, the calculated average indicative of the common blade frequency, wherein the peak detector at least in part determines the common blade frequency by selecting a frequency value from blade edge frequency values whose associated frequency spectrum comprises a highest signal value in a region around the common blade frequency, wherein the frequency spectrum of the vibration quantity comprises at least one peak corresponding to a vibration quantity having a maximum signal in a frequency range of the peak being equal to or approximating the common blade frequency, and setting in a controller of the wind turbine an operational mode of the wind turbine based on the determined common blade frequency, the setting of the operational mode comprising at least one of setting the wind turbine in a shutdown mode, setting the wind turbine in a standby mode, and changing a rotor rotational speed.

* * * * *